Dec. 24, 1968 A. O. ADAMS 3,418,541

RELAY DRIVE CIRCUIT

Filed June 16, 1966 2 Sheets-Sheet 1

INVENTOR.
ANDREW O. ADAMS
BY
Christie, Parker & Hale
ATTORNEYS.

Dec. 24, 1968 A. O. ADAMS 3,418,541

RELAY DRIVE CIRCUIT

Filed June 16, 1966 2 Sheets-Sheet 2

INVENTOR.
ANDREW O. ADAMS.

BY Christie, Parker & Hale
ATTORNEYS.

United States Patent Office 3,418,541

Patented Dec. 24, 1968

3,418,541
RELAY DRIVE CIRCUIT

Andrew O. Adams, Inglewood, Calif., assignor to Leach Corporation, San Marino, Calif., a corporation of Delaware Filed June 16, 1966, Ser. No. 558,022
9 Claims. (Cl. 317—156)

This invention relates in general to electrical circuits for driving relays and similar type switches, and more particularly relates to a new and improved alternating current drive circuit with increased noise suppression and improved output voltage characteristics.

Modern industry, particularly rockets and aircraft, requires numerous relays which must exhibit high tolerances to vibration. Such relays must operate on low power without introducing electrical or radio frequency noise into the power supply source or other associated electrical components located in the proximity of the relay circuitry. The power requirement for such relays is primarily related to the so-called pickup voltage for the relay. This pickup voltage is the voltage required to produce sufficient amounts of current in the relay coil winding so that the contacts may be selectively opened or closed. In prior art alternating current relays, such voltage is normally supplied to the relay coil winding by a full wave rectifier bridge. The prior art bridge drive circuit includes diode pairs properly poled for alternate conductive and non-conductive states so as to establish a required amount of current in the coil winding, which winding, in turn, controls the contact conditions.

As is well known, diodes exhibit reverse current characteristics at the instant of change from a conductive to non-conductive condition. The effect of this, when connected back to back as in a common bridge rectifier across an alternating current line, is to short circuit the line momentarily each time the voltage reverses. On 400 cycle alternating current, this means 800 shorts per second of a finite duration. The radio frequency components of these momentary short circuits produces noise transients and radio interference. Such reverse current characteristics create noise transients which adversely affect not only the relay components but other electrical components as well. Such noise transients, in the form of noise spikes, are electrically reflected into the alternating current source, and thus adversely affect the source of power for numerous other electrical components. In fact, such electrical noise spikes may well exceed the critical noise level for the alternating current supply source and thus impede all circuit operations.

Another aspect of these objectionable noise transients is that the relay and its associated drive circuit are often remotely located from the alternating current input source. Power from the source is supplied over connecting leads to the relay drive. These connecting leads also conduct the noise transients which are reflected into the leads. In addition to acting as conductors such leads act as an antenna. Because of high frequency components of the noise transients, the conducting leads radiate these high frequency noise signals as random radio frequency noise. This radio frequency noise cannot be tolerated in the aircraft and rocket industries because it adversely affects communications and in some instances may contain frequencies which erroneously command certain operations to take place.

Prior art approaches for avoiding radiated radio frequency noise and electrically conducted transient noise have taken different approaches. The most standard prior art approach is to employ filter circuits between the relay drive circuit and the alternating current source. Such filters normally include radio frequency choke coils which are expensive, and along with associated filter capacitors, increase the cost and complexity of the relay drive circuits. These filters additionally increase the power supply requirements, in that more power is required to obtain the higher pickup voltage required when such filters are used. In addition, these components may give off gases when heated and thus contaminate the hermetically sealed relay unless complex and costly insulating and sealing precautions are taken. Furthermore, such additional components increase the number of connections which may work loose under extreme vibration. Accordingly, the reliability of such prior art approaches is less than the reliability of the present invention.

The foregoing objections and disadvantages of the prior art are avoided in accordance with the principles of this invention wherein an alternating current drive circuit having increased noise suppression and improved pickup voltage characteristics is provided. The relay drive circuit of this invention comprises a source of alternating current, a pickup relay coil winding having a main winding with a first tapped auxiliary winding as a continuation of said main winding, a pair of diodes connecting said main winding and its first continuation winding in a series circuit with said source, said pair of diodes being poled conductive only for positive voltage excusions of said signal from said source, a second tapped auxiliary winding as a continuation of said main winding, a second pair of diodes connecting said main winding and its second auxiliary continuation winding in series with said source, said second diode pair being poled conductive only for negative voltage excursions of said main winding, a second pair of diodes connecting said main winding and its second auxiliary continuation winding in series with said source, said secod diode pair being poled conductive only for negative voltage excursions of said signal from said source. The first and second auxiliary windings are continuations of the main winding and thus do not require any additional shielding or additional insulation nor do they increase the manufacturing cost significantly over standard relay windings. In addition, these auxiliary windings are connected in a series aiding manner with the main winding so as to increase the total pickup current in the relay coil with only an insignificant increase in the pickup voltage over known prior art approaches.

The foregoing, and other advantages and features of the present invention, may more readily be understood by reference to the accompanying drawing in which:

FIG. 1 discloses a known prior art relay drive circuit;

Figure 4:
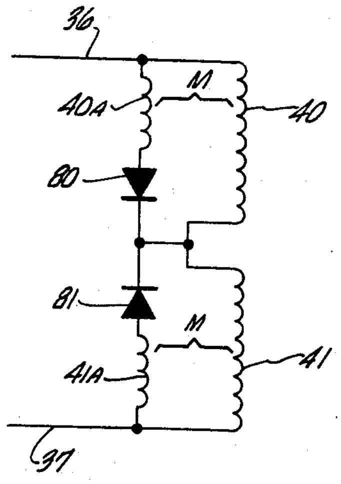
Figure 5:
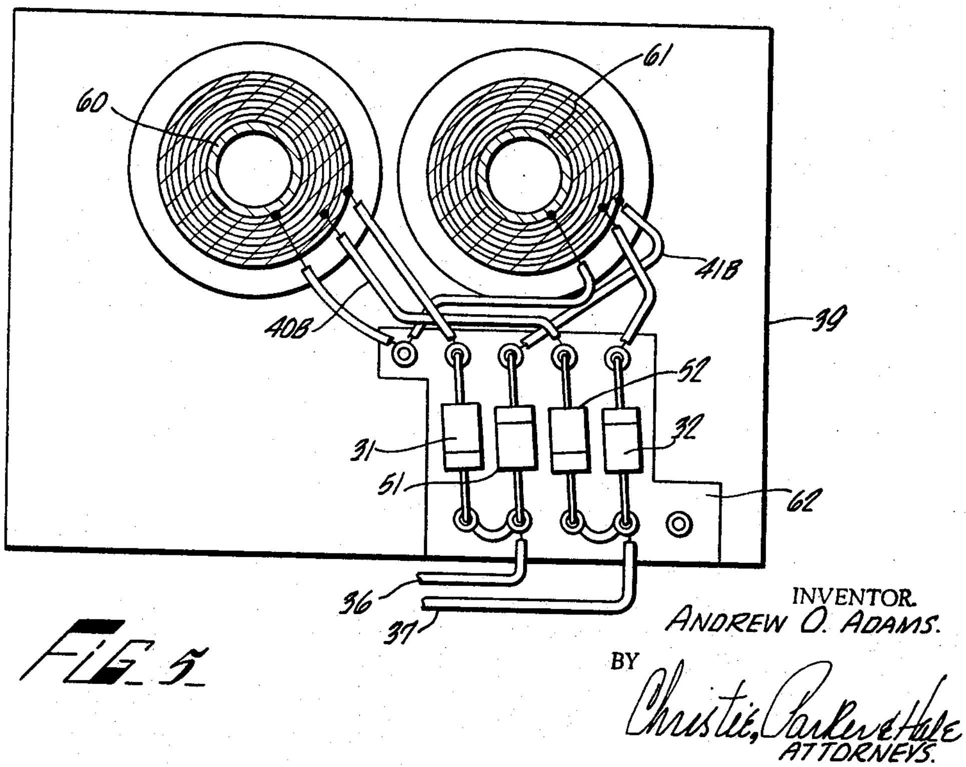

FIG. 4 discloses an alternative embodiment incorporating the features and principles of this invention; and FIG. 5 is a plan view of a relay having a drive circuit and relay pickup coils in accordance with this invention.

Figure 1:
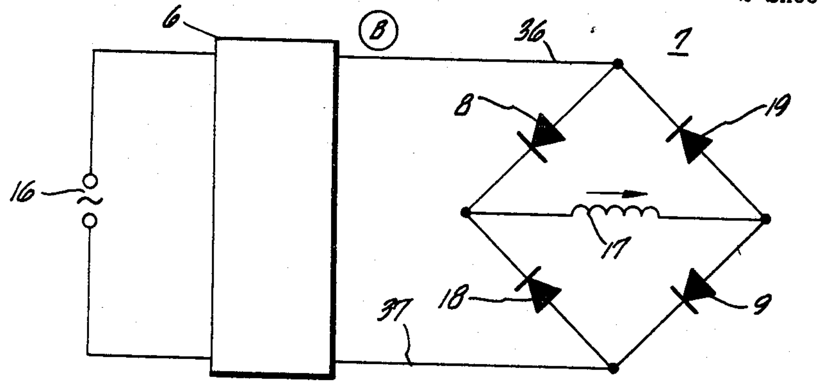
FIG. 1 PRIOR ART

Turning now to the prior art relay drive circuit of FIG. 1, a filter circuit 6 and a full wave rectifier bridge 7 is depicted. Bridge circuit 7 includes a pair of diodes 8 and 9 for completing a circuit through a relay coil winding 17 during positive voltage excursions of input signal 16. Another diode pair 18 and 19 complete a circuit through the relay coil winding 17 during negative voltage excursions of input signal 16. In each instance the completed circuit through bridge 7 provides current flow in the direction indicated through relay coil winding 17. As the diode pairs 8 and 9 and 18 and 19 are alternatively driven conductive and non-conductive, their reverse current characteristics create noise spikes which are electrically reflected into the source by connecting leads 36 and 37. These noise spikes create both electrical and radio frequency interference.

Filter 6 is employed to attenuate the noise spikes created by the change in conductive conditions of the diode pairs 8 and 9 and 18 and 19. Although satisfactory for some operations, filter 6 includes extra components in the form of radio frequency chokes and capacitors which increase the cost of production and detract from the overall reliability of the relay. The radio frequency choke coils and capacitors of filter 6 require additional mounting space in the relay and additional mounting connnectors which may tend to work loose during extreme periods of vibration. Filter 6 also increases the power requirements because the pickup voltage of the drive circuit of FIG. 1 is significantly higher than the pickup voltage of the present invention.

Figure 2:
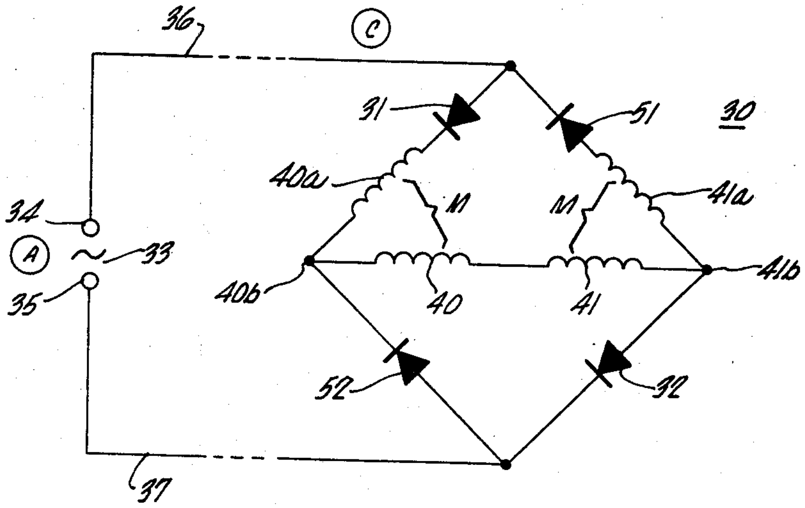
FIG. 2 depicts the new and improved relay drive circuit of this invention.

FIG. 2 depicts the new and improved relay drive circuit 30 of this invention wherein diode pairs 31 and 32 complete a circuit for positive voltage excursions of the alternating current input voltage 33 applied at terminals 34 and 35. The relay drive circuit 30 for a relay 39 is shown in plan view in FIG. 5. FIG. 5 is a top view of two coil windings 40 and 41 wound around bobbins 60 and 61 and a top view of a mounting board 62 for mounting the diode pairs 31, 32 and 51, 52. Turning first to the circuit schematic of FIG. 2, coil winding 40 includes a tapped winding 40A which is a continuation of the main winding 40. Continuation winding 40A and main winding 40 form a tandem coil circuit which is series connected between the cathode of a diode 31 and the anode of a diode 32. The diode pair 31 and 32 are poled to be conductive for positive voltage excursions of alternating current input signal 33. A similar continuation winding 41A of the main winding 41 forms a second tandem coil circuit which is series connected between the anode of a diode 51 and the cathode of a diode 52. Diode pair 51 and 52 are poled to be conductive during negative voltage excursions of input voltage signal 33.

As shown for example in FIG. 5, the auxiliary windings 40A and 41A are actually continuations of the main windings 40 and 41 and may be formed on bobbins 60 and 61 precisely in the same manner as the main windings with the addition of tapped connecting leads 40B and 41B. Each of the relay coil bobbins 60 and 61 thus have three connecting terminals, or leads, which are readily available for connection to a mounting board 62 which securely houses the diode pairs 31, 32 and 51, 52. The input leads 36 and 37 are also connected to mounting board 62 for supplying alternating current input signal 33 from a voltage supply source which may be remotely located. Thus, the drive circuit of this invention is readily constructed in a simple and convenient manner with increased savings in man hours and materials. There is no requirement that the auxiliary windings 40A or 41A be insulated from the main windings 40 and 41, and in fact such windings are inductively coupled to provide extra pickup action and increased noise suppression.

Figure 3:
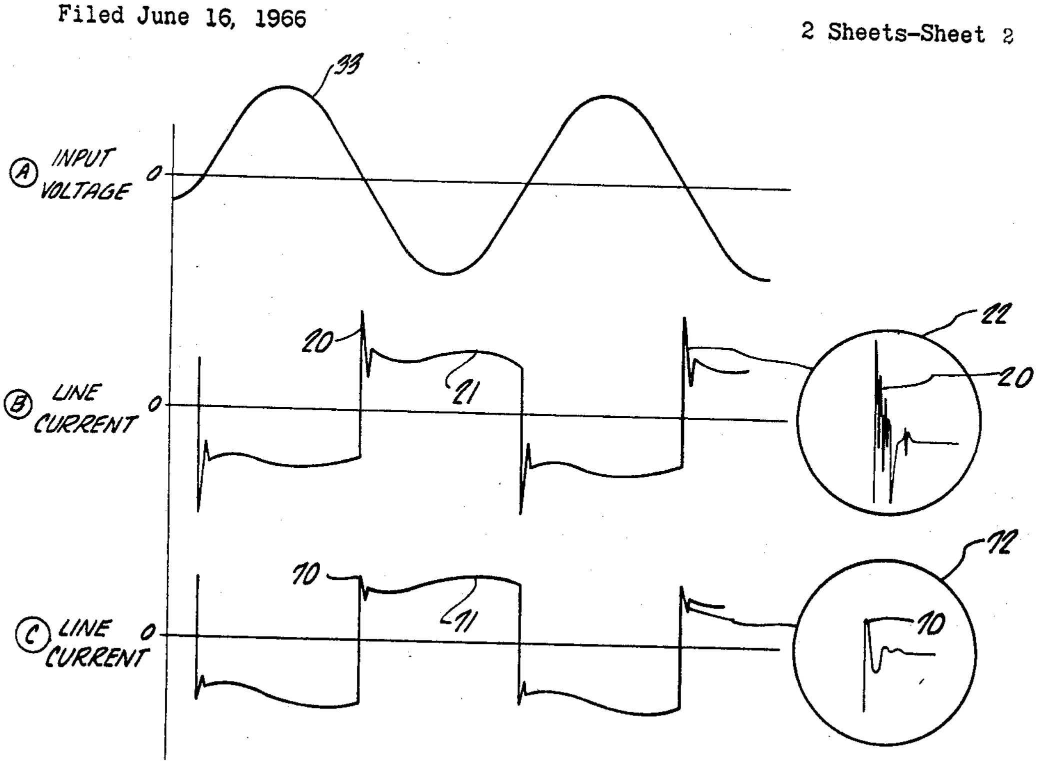
FIG. 3 depicts wave forms which are helpful in promoting a clear understanding of the operation of the circuit of FIG. 2.

FIG. 3 depicts the improved noise suppression for the drive circuit of this invention. An alternating current input signal 33 is shown at line A in FIG. 3. This input signal may, for example, be 115 volts with a frequency of 400 cycles per second. For a more ready comparison with the prior art, lines B and C of FIG. 3 depict the line current 21 as shown in prior art FIG. 1 and the line current 71 as shown in FIG. 2 of this invention, respectively. The sharp noise spikes 20 of line current 21 are created by the reverse current characteristics of semiconductors diode pairs 8 9 and 18, 19 of FIG. 1. These noise spikes are more readily shown in magnified form at inset 22. It is clear from inset 22 that several high frequencies are present in the noise transients 21 of the prior art.

The marked improvement of this invention is readily disclosed by the reduced transient 70 of line current waveform 71. Insert 72, in the same magnified form as inset 22, readily demonstrates that the noise transients of this invention are reduced both in frequency and magnitude. The improvement is due to the resistance and inductive reactance of windings 40*a* and 41*a* being in series with the back to back connections of diodes 31, 52 and 32, 51 thus limiting the short circuit current and suppressing the bulk of the remaining radio frequency transients. During the normal conducting phase, windings 40*a* and 41*a* contribute ampere turns to the magnetic circuit, thus improving the overall efficiency of the circuit as compared to standard filter network suppression. This marked improvement, it should be understood, does not signficantly increase the pickup voltage for the relay. To describe a typical but non-limiting sample the main winding coils 40 and 41 may comprise approximately 4000 turns of wire having a resistance of approximately 400 ohms. Each auxiliary winding includes a tapped continuation winding of 400 turns of wire having a resistance of approximately 40 ohms, or in a ratio of 1 to 10 with respect to the resintance of the main winding. For the same coils and relay the pickup voltage of the prior art drive circuit of FIG. 1 is approximately 63 volts without filter 6, and is between 67 and 70 volts with filter 6 employed.

In comparison the pickup voltage of this invention is approximately 64 volts, or about one volt higher than the circuit of FIG. 1 without any noise suppression afforded by filter 6. The prior art circuit, in order to achieve noise suppression comparable to this invention can do so, only at the cost of extra components such as filter 6, thus requiring a detrimental increase in the pickup voltage.

FIG. 4 depicts an alternative embodiment which employs one pair of diodes 80 and 81 with their cathodes connected in common with each other, and also in common with one end of each relay coil winding 40 and 41. The anode of diode 80 is connected in a first series circuit with the auxiliary winding 40A and this series circuit is connected in parallel across main winding 40. Similarly, the anode of dode 81 is connected in a second series circuit with auxiliary winding 41A and the series circuit is connected in parallel across main winding 41. Although the noise suppression and pickup voltage of the circuit of FIG. 4 are less salient than those of FIG. 2, the circuit of FIG. 4 nevertheless presents marked improvement over the prior art; and offers the additional advantage of savings in components as only one diode pair is employed.

It should be understood that the principles of this invention are equally applicable to a single coil relay which would require two tapped auxiliary windings connected in the manner described hereinbefore. Other principles and features of this invention as well, it should be understood, will be readily available to those skilled in the art without departing from the spirit and scope of the claimed invention.

What is claimed is:

1. An electrical circuit for supplying power to a relay comprising:
   (a) a supply source of alternating current signals,
   (b) a relay winding for controlling contact states in said relay, said coil winding having a main winding with first and second auxiliary windings defined by tapped connections made to said main winding,
   (c) a first pair of diodes connecting said main winding and said first auxiliary winding in a first series circuit for positive voltage excursions of said supply source signal, and
   (d) a second pair of diodes connecting said main winding and said second auxiliary winding in a second series circuit for negative voltage excursions of said supply source signal.

2. A relay power supply circuit in accordance with claim 1 wherein:
   (a) said first and second auxiliary windings relative to the current conducted therethrough, are series-aiding continuations of the main winding.

3. A relay power supply circuit in accordance with claim 2 wherein:
(a) both said main winding and said auxiliary windings are formed of a number of turns of one wire wherein the number of turns of wire in the main winding relative to the number of turns in said first or said second auxiliary winding is substantially in the ratio of ten to one.

4. A relay power supply circuit in accordance with claim 1 wherein:
(a) said main winding comprises first and second series connected coil windings inductively isolated from each other, and wherein
(b) said first auxiliary winding is a continuation of said first coil winding and said second auxiliary winding is a continuation of said second coil winding.

5. A relay power supply circuit in accordance with claim 4 wherein:
(a) said first pair of diodes is poled in said first circuit to supply current in one direction through both said series connected coil windings, and
(b) said second pair of diodes is poled in said second circuit to supply current in said same direction through both said series connected coil windings.

6. A relay power supply circuit in accordance with claim 1 wherein:
(a) each of said diodes is a semiconductive device having an anode and a cathode, and each exhibiting reverse current noise transients, and wherein said supply circuit further comprises;
(b) first means connecting the anode of one diode and the cathode of the other diode of said diode pair across said supply source,
(c) second means connecting the series connected first auxiliary and main winding between the cathode of said one diode and the anode of said other diode of said first diode pair,
(d) third means connecting the anode of one diode and the cathode of the other diode of said second diode pair across said supply source, and
(e) fourth connecting means connecting the series connected second auxiliary and said main winding between the cathode of said one diode and the anode of said other diode of said second diode pair.

7. A relay drive circuit comprising:
(a) a current conductive coil winding for controlling contact closures in a relay,
(b) a supply source of opposite polarity alternating current signals,
(c) first and second semiconductive switch means, each emitting electrical noise transients when changing from conductive to non-conductive conditions in accordance with the polarity of signals applied thereto,
(d) a first continuation winding of said coil winding connected in a first tandem circuit therewith,
(e) a second continuation winding of said coil winding connected in a second tandem circuit therewith,
(f) first means connecting said first switch means and said first tandem circuit in a first series circuit with said supply source, said first continuation winding being operative in said first series circuit for isolating said source from said noise transients emitted by said first switch means, and
(g) second means connecting said second switch means and said second tandem circuit in a second series circuit with said supply source, said second continuation winding being operative in said second series circuit for also isolating said source from said noise transients emitted by said second switch means.

8. A relay drive circuit comprising:
(a) a supply source of alternating current signals,
(b) a current conductive coil winding for controlling contact closures in a relay, said coil winding having a main winding portion with first and second auxiliary winding portions defined by first and second tapped connections made to said main winding,
(c) a third center-tap connection for said main winding,
(d) first and second semiconductive means, each having an input terminal and an output terminal, each of said semiconductive means exhibiting reverse current electrical noise transients,
(e) first means connecting both of said output terminals of said first and said second semiconductive means in common to said third center-tap connection,
(f) second means connecting said first and said second tapped connections across said supply source,
(g) third means connecting said second auxiliary winding to the input terminal of said first semiconductive means for isolating said supply source from reverse current transients exhibited by said first semiconductive means, and
(h) fourth means connecting said first auxiliary winding to the input terminal of said second semiconductive means for isolating said suply source from reverse current transients exhibited by said second semiconductive means.

9. A relay drive circuit in accordance with claim 8 wherein:
(a) said first and said second auxiliary winding portions relative to the current conducted therethrough, are series-aiding continuations of the main winding portion.

References Cited

UNITED STATES PATENTS

| | | | |
|---|---|---|---|
| 2,895,100 | 7/1959 | Filberich et al. | 321—11 |
| 3,258,646 | 6/1966 | Fowler. | |
| 3,260,915 | 7/1966 | Gregg | 321—11 |
| 3,328,667 | 6/1967 | Shaneman | 321—11 X |

JOHN F. COUCH, *Primary Examiner.*
W. H. BEHA, Jr., *Assistant Examiner.*

U.S. Cl. X.R.

317—155.5; 321—11